Figure 9:
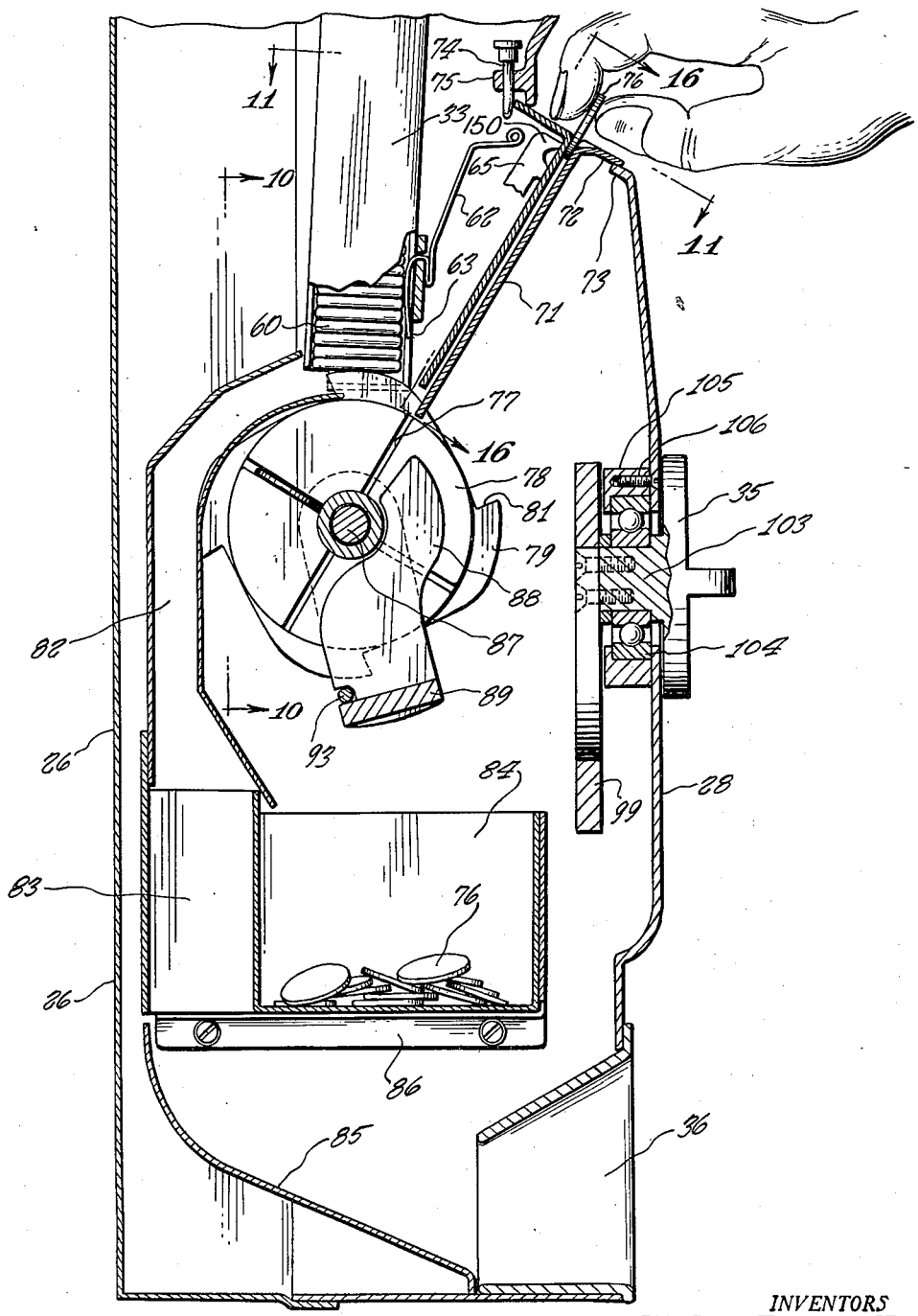

Oct. 16, 1951     G. P. BOOTH ET AL     2,571,668
COIN CONTROLLED VENDING MACHINE
Filed July 12, 1947     7 Sheets-Sheet 1
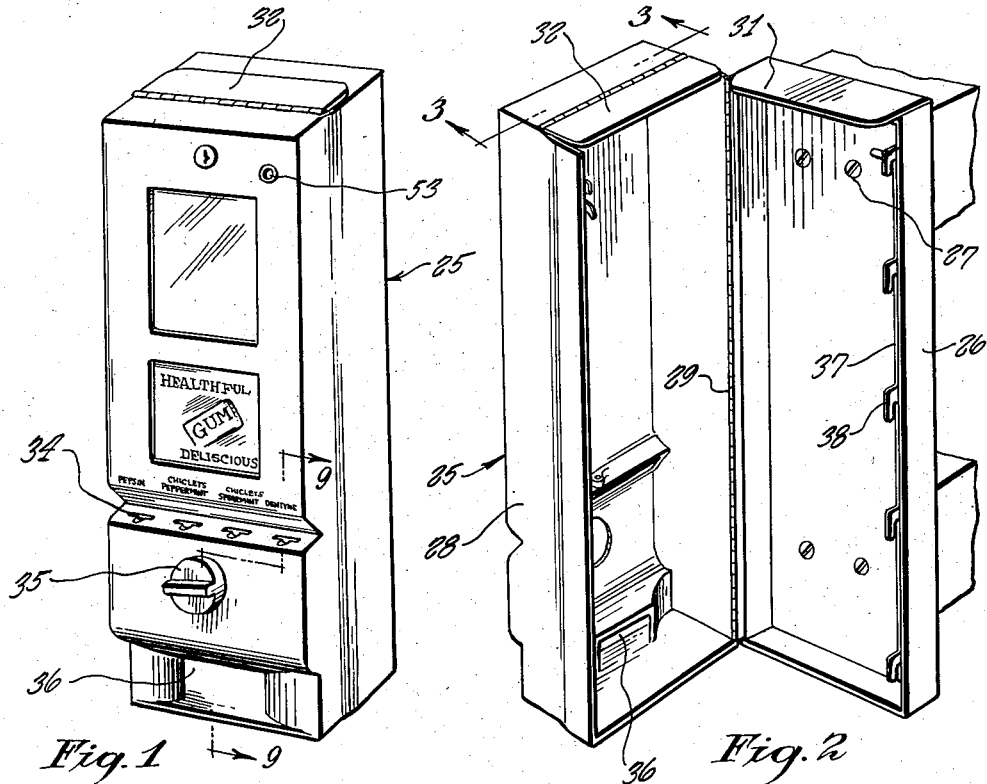
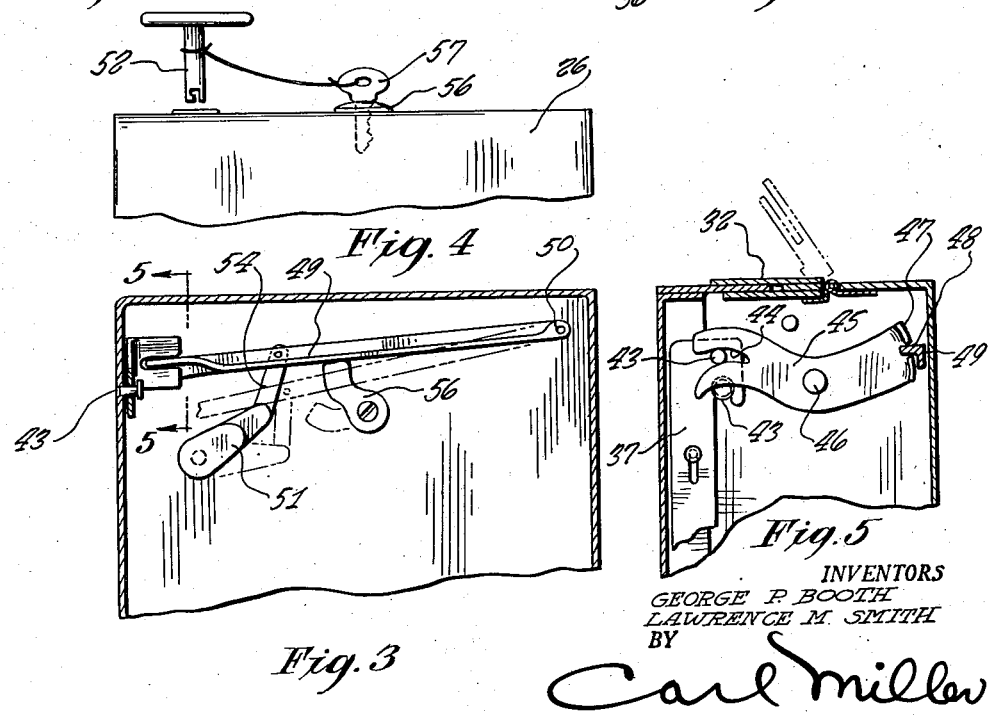
INVENTORS
GEORGE P. BOOTH
LAWRENCE M. SMITH
BY Carl Miller
ATTORNEY

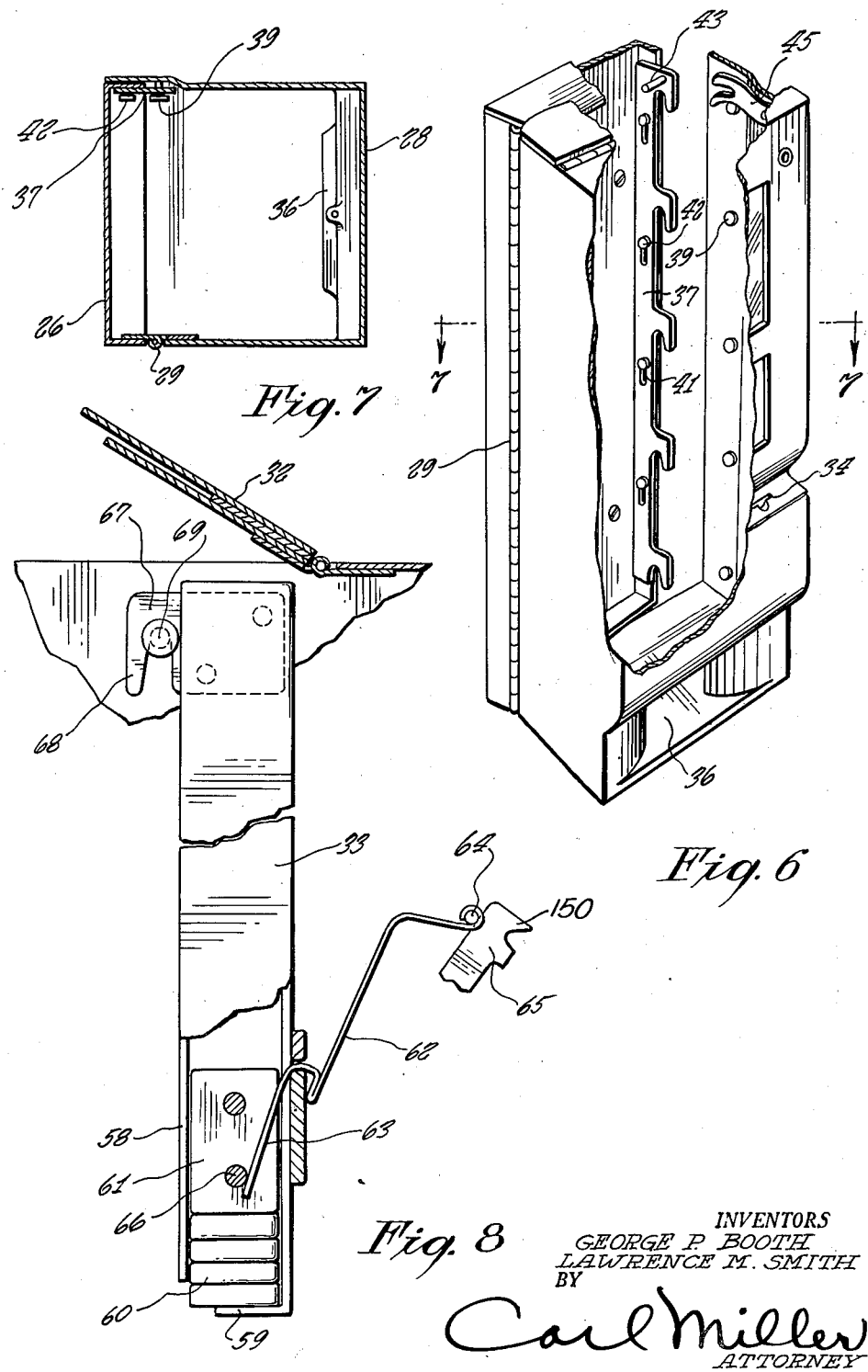

Oct. 16, 1951 G. P. BOOTH ET AL 2,571,668
COIN CONTROLLED VENDING MACHINE
Filed July 12, 1947 7 Sheets-Sheet 3

INVENTORS
GEORGE P. BOOTH
LAWRENCE M. SMITH
BY
Carl Miller
ATTORNEY

Oct. 16, 1951　　G. P. BOOTH ET AL　　2,571,668
COIN CONTROLLED VENDING MACHINE
Filed July 12, 1947　　7 Sheets-Sheet 5

INVENTORS
GEORGE P. BOOTH
LAWRENCE M. SMITH
BY
Carl Miller
ATTORNEY

Oct. 16, 1951  G. P. BOOTH ET AL  2,571,668
COIN CONTROLLED VENDING MACHINE
Filed July 12, 1947  7 Sheets-Sheet 6

INVENTORS
GEORGE P. BOOTH
LAWRENCE M. SMITH
BY
Carl Miller
ATTORNEY

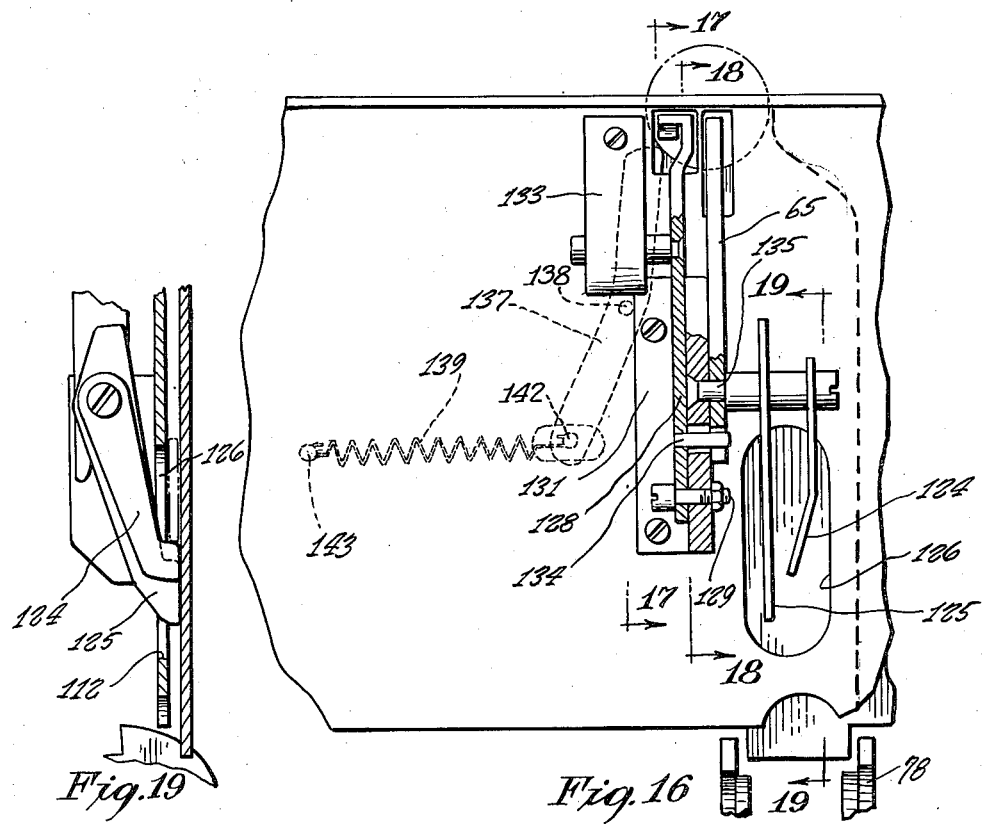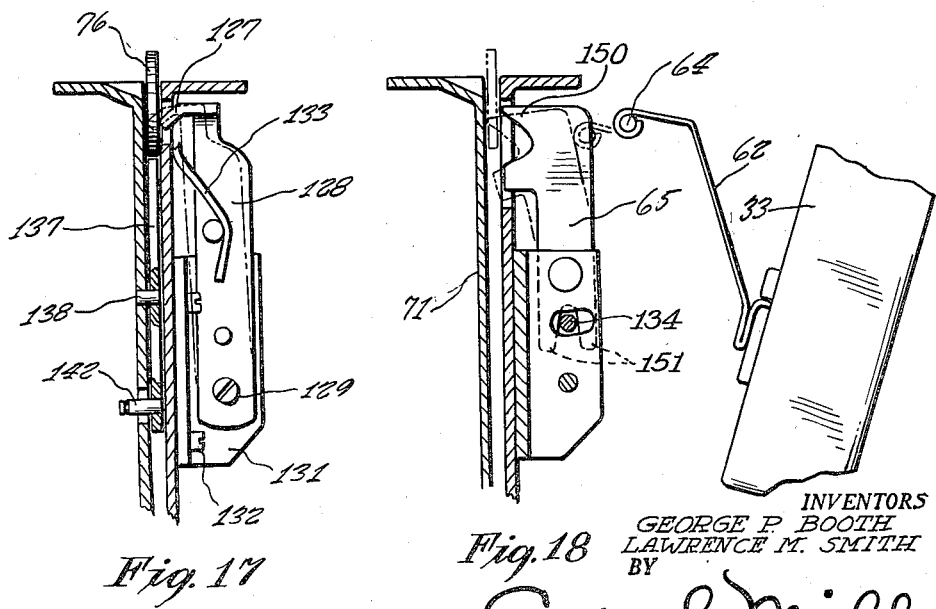

Patented Oct. 16, 1951

2,571,668

UNITED STATES PATENT OFFICE 2,571,668

COIN-CONTROLLED VENDING MACHINE

George P. Booth, Dobbs Ferry, N. Y., and Lawrence M. Smith, West New York, N. J., assignors to Interborough News Company, New York, N. Y.

Application July 12, 1947, Serial No. 760,678

6 Claims. (Cl. 194—85)

1

This invention relates to coin operated gum machines.

It is an object of the present invention to provide a gum machine which is formed of separable casing parts and a simple and sturdy lock device adapted to retain the parts when closed upon one another and wherein there is provided at the top of the machine a flap which can be raised to permit the withdrawal of the gum containers when the front casing part is moved to an open position and wherein the flap is arranged to receive a lip on the rear casing part so that when the casing parts are united there will be provided a double protection at the top of the casing to prevent the insertion of some tool by an intruder.

It is another object of the present invention to provide a gum machine which is adapted to contain as many thick gum packages as thin gum packages without having to extend the height of the casing to make room for the large gum packages.

It is another object of the present invention to provide a gum machine wherein the coin itself is retained and engaged by abutments while extended across a space and so that the abutments will engage with a flat face of the same to carry the operating parts with the abutments to dispense the gum.

It is another object of the present invention to provide in a coin operated gum machine, parts associated with the coin chute adapted to retain a coin so that as a second coin is inserted the coin which is retained will be in position to enter into the slots of the discs for receiving the same and without the coin which has been inserted having to pass the full distance through the chute and wherein the latter coin is arrested within the chute and will serve as the intermediary with the next operation of the machine and wherein there is a coin always ready in place to enter the working parts.

Other objects of the present invention are to provide a coin operated gum machine which is of simple construction, compact, which has minimum parts, inexpensive to manufacture and efficient in operation.

For other objects and for a better understanding of the invention, reference may be had to the following detailed description taken in connection with the accompanying drawing, in which Fig. 1 is a front perspective view of my coin operated gum machine, looking upon the exterior thereof and as it appears to a customer, Fig. 2 is a perspective view of the casing parts opened up and looking into the interior of the same and upon certain of the locking parts,

2

Figure 10:
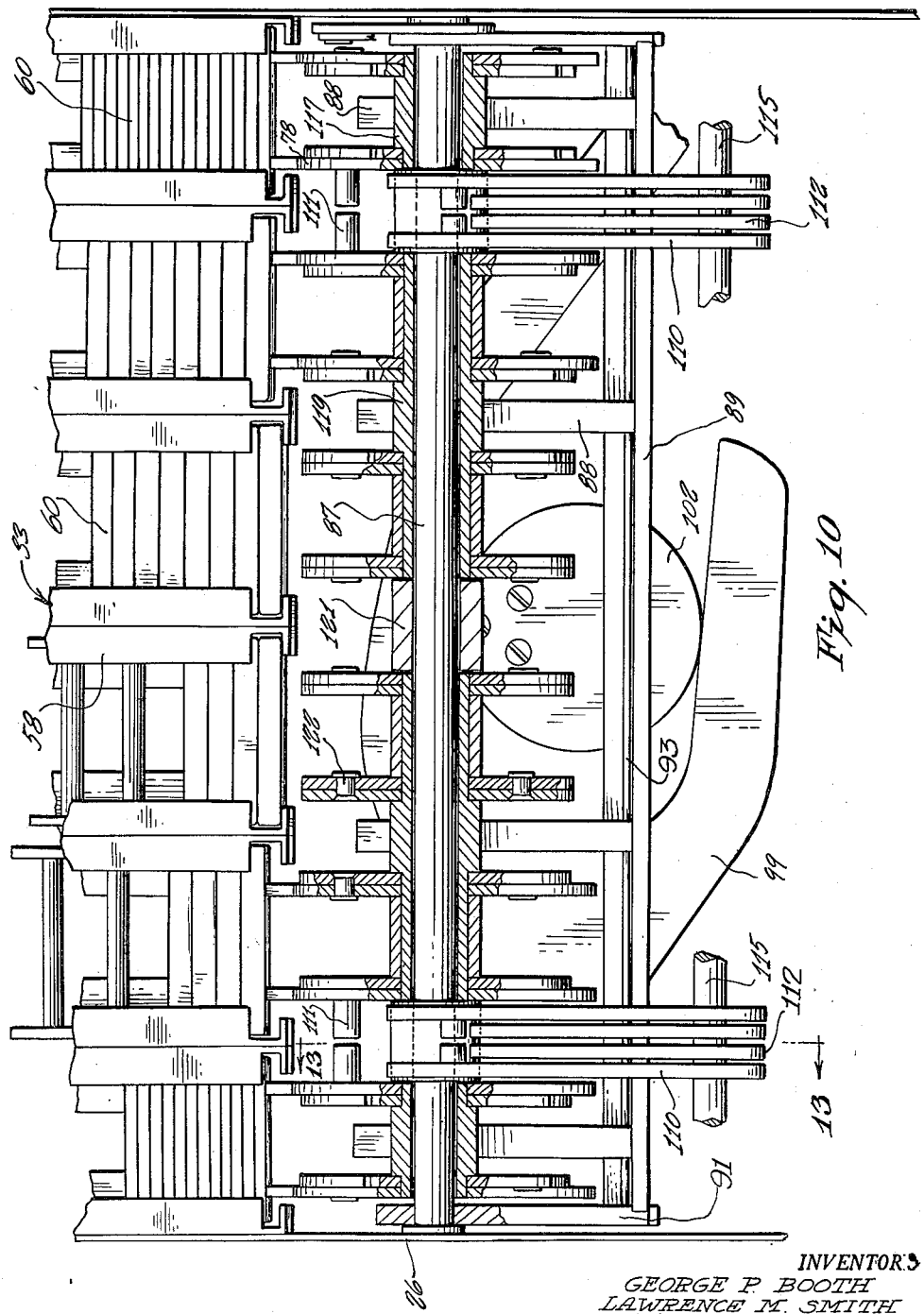
Figure 11:
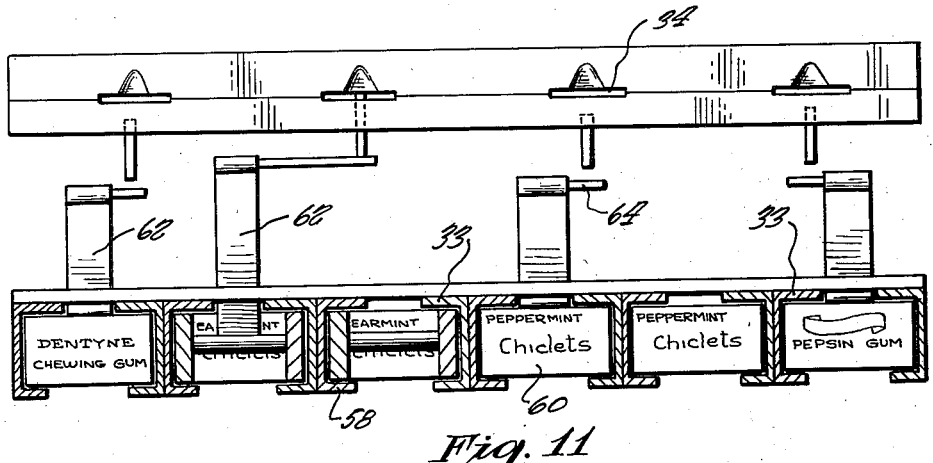
Figure 12:
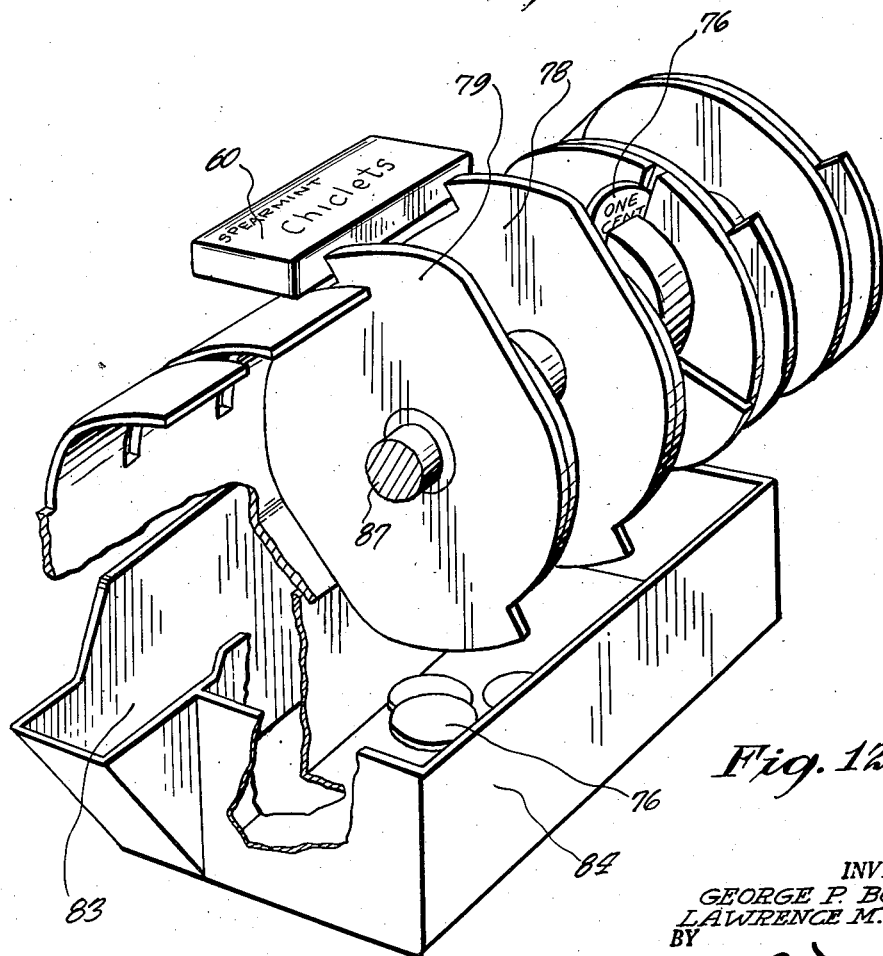
Figures 13, 14:
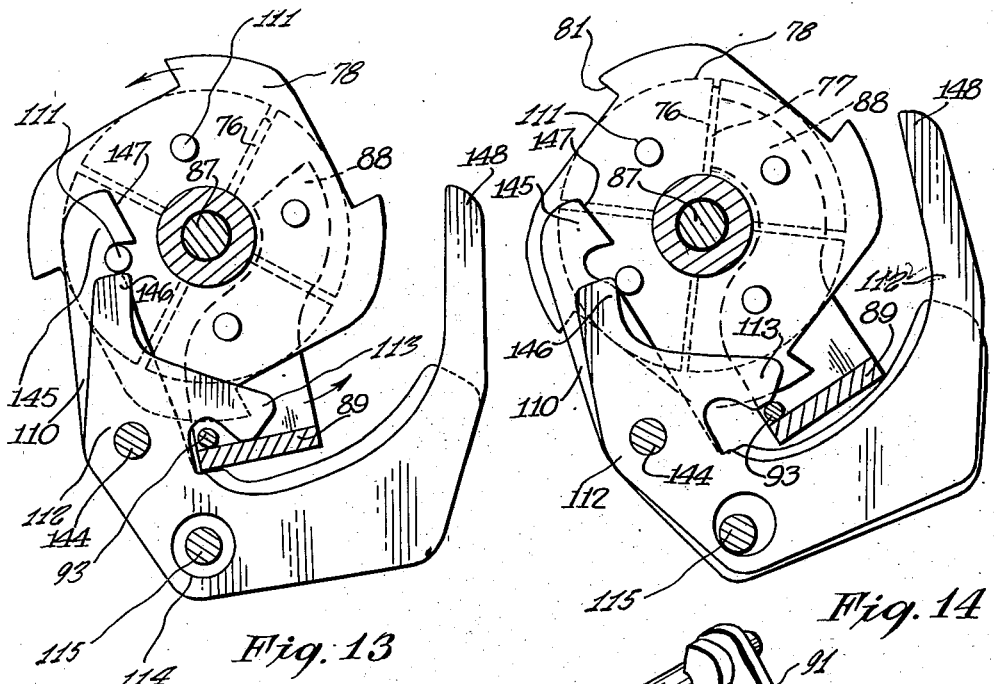
Figure 15:
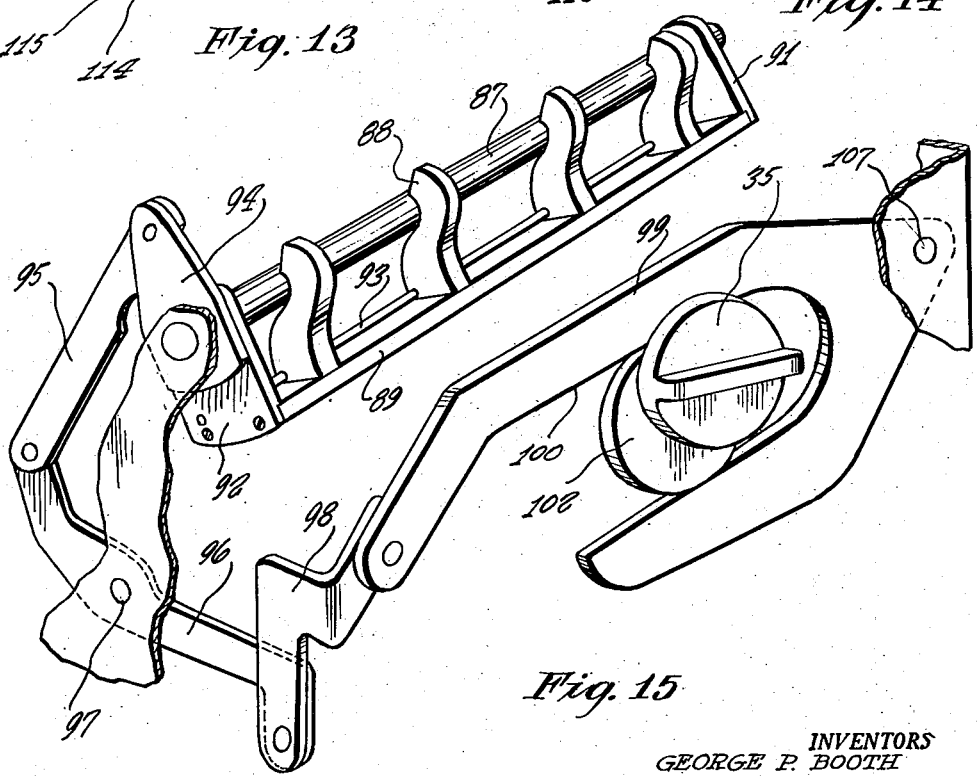

Fig. 3 is an enlarged fragmentary and cross-sectional view looking into the rear of the front casing part and upon the lock operating members located at the top of the casing part, Fig. 4 is a fragmentary top plan view of the top of the front casing part with the lock key inserted and with the removable turning knob for the latch removed from its opening and at a location in alignment therewith, Fig. 5 is a fragmentary cross-sectional view looking upon the latch elements at the side of the front casing and taken on line 5—5 of Fig. 3, Fig. 6 is a perspective view of the casing with portions broken away from the front to look into the interior of the casing and upon the latch elements, Fig. 7 is a transverse cross-sectional view taken generally on line 7—7 of Fig. 6 but with the casing parts closed and latched, Fig. 8 is a fragmentary and cross-sectional view of one of the gum containers and showing the same suspended from the top of the casing part, Fig. 9 is an enlarged cross-sectional view, in elevation, taken through the lower part of the gum machine to show the coin chute, the operating mechanism, the turn handle, the gum chute and the coin receiving box, Fig. 10 is an enlarged fragmentary and cross-sectional view of the gum ejecting parts taken generally on line 10—10 of Fig. 9, Fig. 11 is a fragmentary cross-sectional view taken generally on line 11—11 of Fig. 9, Fig. 12 is a fragmentary and perspective view of a portion of the gum ejecting mechanism showing how the coins and gum are handled and passed respectively to the coin box and the gum chute, Fig. 13 is a cross-sectional view taken through the operating mechanism on line 13—13 of Fig. 10 with the parts in one position, Fig. 14 is a cross-sectional view taken generally on the same line 13—13 of Fig. 10 but with the parts adjusted to another position, Fig. 15 is a fragmentary perspective view of the linkage between the turn handle and the coin engaging device through which the force for operating the mechanism is imparted when a coin is in place to be abutted by the coin engaging parts, Fig. 16 is a fragmentary view of the coin receiving mechanism taken generally on line 16—16 of Fig. 9, Fig. 17 is a cross-sectional view of the coin receiving mechanism taken generally on line 17—17 of Fig. 16, Fig. 18 is another cross-sectional view of the coin receiving mechanism taken generally on line 18—18 of Fig. 16, Fig. 19 is still another cross-sectional view of the coin receiving mechanism but taken generally on line 19—19 of Fig. 16.

Referring now particularly to Figures 1 to 8, 25 represents my gum machine casing having a rear part 26 adapted to be secured to a wall or post by screws 27 accessible only from the interior of the part and a front part 28 connected at one edge by a piano hinge 29 to the rear part. The rear part 26 has at its top end a forwardly-extending lip 31 adapted to be projected into a hinged flap 32 of the front part when the flap is down whereby to provide a good sealing engagement of the parts at the top of the casing and to provide a portion on the front part which can be lifted to facilitate the removal of a gum container 33 which is carried on the front part and which is removed at times when it is to be filled or when it is to be replaced by another gum container which has already been previously filled, Fig. 7.

The front casing part 28 is provided with a plurality of coin slots 34 into which the coins are dropped, a turn handle 35 for operating the machine when the coin has been dropped and an outlet opening 36 from which the dispensed gum piece is taken.

On the rear part 26 at the side of the same opposite from the hinge is a vertically-slidable latch 37 having hook portions 38 adapted to be dropped over pin projections 39 on the side of the front part 28 so as to lock the parts together when they are closed. The latch 37 has a plurality of elongated openings 41 through which extend respectively pin projections 42 on the side of the rear part 26 that serve to support the latch 37. The upper end of latch 37 has a pin 43 extending laterally therefrom and adapted to be received by a slot 44 in a lever 45 pivoted as indicated at 46 to the side of the front casing part and serving when pivoted to lift the latch 37 and release the casing parts so that the front part will be swung open. The end of the lever 45 is inwardly bent as indicated at 47 and has a slot 48 for receiving the end of a long arm 49 pivoted at 50 to the front part 28. Also pivoted on the front part is an arm 51 which can be operated by the extension of a knob 52 through a hole 53 on the front casing part for engagement with the arm 51. This arm 51 is connected by a link 54 with long arm 49. With the latch operating arms extended as shown in Figs. 3 and 5, the latch 37 will be extended so that its hook portions engage with the pins 39 to lock the casing parts together. While in this position a lock 55 operated by a key 57 will prevent the operation of the latch. As the key 57 is inserted into the lock to turn the lock to a dotted line position as shown in Fig. 4, the knob 52 and the operating arms for the latch can be adjusted to the dotted line positions, whereby to raise the latch 37 from the pins 39 to release the casing parts. As the casing parts are opened, the flap 32 will be pulled from the lip portion 31 on the rear part 26 and will be free to be elevated to gain access to the gum containers 33 in the front part so that their removal can be easily had.

The gum container 33 is formed of a channel piece with front flanges 58 and an inwardly bent portion 59 for supporting a stack of gum packages 60. A weight 61 keeps the packages in tight stack engagement with one another within the container. The gum packages are loaded from the upper end of the container after first removing the weight 61. Thereafter the weight will feed the gum packages downwardly to the inwardly bent supporting portion 59. On the container there is mounted a spring strip 62 which has an extension 63 adapted to be extended along the sides of the gum packages as shown in Fig. 9 to keep a rod 64 mounted on the upper end of the spring 62 out of engagement with a member 65 adapted to be dropped into the coin slot to prevent further insertion of coins therein when the gum supply in the container has been exhausted. When there are but a few gum packages left and the weight 61 has been dropped to a point to permit the portion 63 to swing free of the gum packages and into engagement with a bottom rod 66 of the weight, the spring strip 62 will be free to inject the member 65 into the coin slot.

On the upper end of the gum container there are secured at the opposite sides thereof hang brackets 67 with hook portions 68 adapted to be extended over a transversely extending rod or shaft 69 extending between the sides of the front casing part and on which the containers are supported.

The coin slot 34 is provided in the end of a coin chute 71, Fig. 9, which has a top flange 72 adapted to rest on the lower edge 73 on the front part and to be retained thereagainst by a fastener 74 extending through a projection 75 of the front part.

A coin 76 is inserted in the coin slot and this coin will traverse the chute 71 and will enter radially extending slots 77 in the side faces of discs 78 having projections 79 on their outer periphery ninety degrees apart. The projections 79 have shoulder faces 81 adapted to engage in sequence with the gum packages, as the discs 78 are turned to push the gum packages one at a time from the bottom of the gum stack in the container 33, and into a gum package chute 82 for passage downwardly through an opening 83 in a coin box structure 84 and dropped on an inclined sheet 85 for delivery to the gum slot or outlet 36 in the front casing part. The coin box is supported on brackets 86 and can be removed for the purpose of dumping the coins which may have been collected within the same.

As the disc assembly 78 is stepped about the central supporting shaft 87, the coins will move with it and are retained therein until finally they are discharged into the coin box 84. The coin 76 when in the slots 77 becomes the intermediary through which motion resulting from the turning of the handle 35 is imparted through mechanism to be presently described and including abutments 88 for the engagement with the coin as these abutments are rotated. The disc assembly 78 will be moved through a quarter turn by the abutment 88 whereby to cause the gum package to be ejected.

The abutments rigidly attached to a transverse member 89 which is extended between end members 91 and 92 pivoted on shaft 87. A releasing rod 93 passes through the lower ends of the abutments 88 and is connected to the end plates 91 and 92. This rod is provided for the release of a stop means which will be explained hereinafter. To operate the abutments an arm 94 is fixed to the end plate 92 and its outer end is pivotally connected to a link 95 extending from a lever 96 pivoted on the casing part as indicated at 97 and connected by a link 98 to an operating arm 99 on the front casing part adapted to be operated by the turn handle device 35. The operating arm 99 has a slot 100 in which is extended an eccentric plate 102 on a shaft portion 103 of the turn handle. The shaft portion of the turn handle is mounted in a ball bearing unit 104 retained on the casing part by a clamp ring 105 fixed to the casing part by screws 106. The operating arm 99 is pivoted to the front casing part as indicated at 107, Fig. 15, and as the turn handle 35 is turned it is pivoted and likewise the linkage parts will be moved to rotate the abutment support 89 on the shaft 87 and the abutments 88. If a coin has been inserted in any one of the coin slots and extended to the radial slots of a disc assembly, one or more gum packages will be dispensed depending upon the number of coins which have been inserted respectively at different slots in the machine. If no coins have been inserted in the slots, the turn handle can be rotated and the abutments swung but no gum would be dispensed.

Referring now particularly to Figs. 13 and 14, there is shown a stop mechanism for limiting the rotation of the disc elements 78 to a part revolution at a time so that only one piece of gum will be dispensed for each coin inserted. This stop mechanism comprises a hook member 110 and a catch member 112 both being pivoted on a suitable fixed pivot such as the rod 144 which is mounted on the casing parallel with and below the shaft 87. The hook member 110 has a hook-shaped portion 145 which sequentially receives one of the stop pins 111 to prevent rotation of the disc elements in one direction, namely clockwise, as viewed in Figs. 13 and 14. The catch member 112, on the other hand, prevents rotation of the disc elements in a second direction, namely counterclockwise, as viewed in Figs. 13 and 14, by sequentially abutting one of the stop pins with a pin-engaging portion 146. It will be seen, therefore, that when the hook member 110 and the catch member 112 are in their normal positions, as shown in Fig. 13, the disc elements are locked and cannot be rotated. The hook member 110 and the catch member 112 are normally biased to the pin-engaging position by gravity in the specific embodiment shown since they are pivoted on rod 144 at a position near their pin engaging ends; to limit their pivotal movement, a fixed bar 115 is provided which extends between the sides of the casing through the large holes 114 in the members 110 and 112. Upon the initial pivoting movement of the abutment means and prior to engagement of the abutment 88 with the coin 76, a catch member releasing arm 113 is moved upwardly by the releasing rod 93 to pivot the pin-engaging portion 146 outwardly and thereby release the pin 111 and allow the disc elements 78 to be rotated counterclockwise when the abutment 88 engages the coin 76. In other words, the lost motion of the abutment means, which occurs during its initial movement into abutting relationship with the coin, is utilized for releasing the pin 111 from the catch member 112 to allow rotation of the disc elements when the abutment means contacts the coin. As the disc elements are rotated another pin 111 is moved into the original position of the first pin, and during this movement it contacts the top or camming surface 147 of the hook member 110 causing the hook-shaped portion 145 to be pivoted outwardly from its normal position. After the second pin has passed over the lower end of the top or camming surface 147, the hook member 110 pivots back to its normal position and engages the pin. In the meantime the catch member 112 has also pivoted back to its normal position to abut the pin and retain the pin within the hook-shaped portion 145 of the hook member. To insure the return of the catch member 112 to its normal pin-engaging position prior to the movement of the second pin to this position, the catch member is provided with an extension 148 which is engaged and moved outwardly by the transverse member 89 of the abutment means during the final gum dispensing movement thereof. By this arrangement the pin-engaging portion 146 is pivoted inwardly into pin-engaging position for receiving the second pin. In this manner the initial counterclockwise movement of the catch member 112 is positively arrested and the pin-engaging portion 146 is returned to its pin-engaging position, thereby preventing further rotation of the disc elements 78 and the dispensing of more than one package of gum.

In Fig. 10, it will be seen that there are provided only two containers of thin gum packages while more containers with thick or double size gum packages are used. The containers with the thin gum packages are located at opposite sides of the machine. The discs having the projections for ejecting the gum packages form separate ends of spool-like elements which are arranged on the shaft 87. The spool-like elements for the thin gum packages as shown in Fig. 10 includes a bearing sleeve 117 on which the discs 78 are mounted. The coin is received between the discs entering slots 77 of each disc whereby the coins will be supported from opposite ends and the abutments 88 enter the space between the discs for engagement with the coins. Since with these end spools there are provided projections, ninety degrees apart, one gum package will be ejected for each quarter turn of the spool-like element.

With the large gum packages, there is provided a long bearing sleeve 119 on which four of the discs are arranged. Two discs are located below each gum container. The discs for ejecting the large gum packages have only two shoulders 81, one hundred and eighty degrees apart, and the discs under one gum container are angled ninety degrees from the discs under the other gum container, so that gum is ejected from but one gum container at a time. The gum is ejected from first one gum container and then the other in the case of the large gum packages. By having four containers for large gum packages and two containers for thin gum packages, the machine may retain the same number of large gum packages as there are small gum packages. The coin, in the case of the discs for the large gum packages, is received at a location intermediate the two inner discs on the sleeve 119. A bearing 121 is provided on the casing part to support the shaft 87 intermediate its ends. Each disc 78 comprises two parts which are riveted together as indicated at 122.

Referring now particularly to Figs. 16 to 19, there is shown a device for retaining the coin within the coin chute so that a coin is always retained therein for effecting the next operation of the gum machine. The arrangement serves also to prevent the insertion of more than one coin at a time into the gum machine. Every time that a coin is placed in the coin chute, a previously arrested coin will be released automatically to be used in effecting the gum ejecting operation as the handle 35 is turned. Accordingly only one coin can be fed at a time to the coin receiving discs 78.

Associated with the coin chute 71 at a low location are members 124 and 125 which may be extended through a slot 126 into the coin chute to prevent the passage of the coin downwardly through the coin chute. This coin is retained in the coin chute until another coin is placed into the slot at the top thereof. When the other coin is placed in the slot it is pressed downwardly upon a lip 127 whereby to cause as illustrated in Fig. 17, the outward movements of an arm 128 pivoted on a fastening screw 129 on a bracket 131 secured by screws 132 to the coin chute. This outward movement will be against the action of a leaf spring 133. As this outward movement is effected, the arm 128 through a pin 134 will cause member 65 to be pivoted a slight amount with its pin 135 on which the upper ends of the arms 124 and 125 in the slot 126 are fixed. Automatically, the coin which is already retained by the members 124 and 125 will be released and will drop into place in the slots in the discs 78. As seen in Fig. 9, the member 65 is positioned at an angle from the vertical so that its own weight will tend to pivot the cam point 150 into the coin chute 71. Sufficient clearance is provided between the legs 151 of the member 65 and the pin 134 to allow movement of the cam point 150 into the coin chute 71 without further movement of the arm 128, as seen in Figs. 16-18. If a coin is inserted in the coin chute, the arm 128 will be pivoted outwardly and upwardly and the member 65 will be pivoted inwardly and downwardly. Due to the play between member 65 and pin 134, the cam point 150 on member 65 is free to move further into the coin chute and ride on the surface of the coin. However, upon the insertion of a metal ring, such as a washer, the cam point 150 will move into the hole of the metal ring and prevent complete insertion thereof by abutting the edge of the hole with its flat upper edge. The lower edge of the cam point 150 is curved to facilitate removal of the metal ring to clear the coin chute for future use.

Within the slots or chute opening there is extended a pivot arm 137, pivoted at 138 and normally retained into a position within the upper end of the chute by a tension spring 139 connected to the lower end of the arm 137 and upon a projection 142 thereon and an anchor point 143 on the coin chute. As the coin engages the upper rounded end of the arm 137, it will cause the arm to pivot and the spring 139 to be extended sufficiently to permit the easy passage of the coin downwardly through the coin chute. When the upper curved surface of the coin 76 is moved into contact with the pivot arm 137, the tensioned spring causes the pivot arm to exert a force on the coin thereby accelerating the rate of movement of the coin through the coin chute 71 and insuring positive delivery of the coin.

It should be apparent that there has been provided a gum machine which can contain an equal number of large gum packages and thin gum packages, and wherein the coins on being dropped into the slot merely replaces another coin already retained in the coin chute and which will enter the slots in the discs to serve as the intermediary for causing the rotation of the discs when the abutments are brought into place by the turning of the turn handle. The coin which is deposited is not used until the next operation of the turn handle and upon the placing of another coin in the slot.

It should be further apparent that there has been further provided a casing formed of parts which is tight and which is so constructed that intruders cannot readily gain access to the same. It should be further apparent that there has been provided a compact gum machine wherein the casing parts are so formed that there is little space which is vacant within the machine and wherein there is a flap provided upon one of the parts which can be raised in order to permit the lifting of the gum containers and wherein this flap serves as a seal over the top edge of the casing parts. It should be further apparent that there has been provided a simple and efficient lock mechanism for the casing parts which can be lifted positively after the lock which is a separate mechanism is turned to permit the lifting of the latch.

The present application is the parent application of a divisional application Serial No. 240,092 filed August 3, 1951, which includes claims directed to the coin handling mechanism disclosed but not claimed herein.

While various changes may be made in the detail construction, it shall be understood that such changes shall be within the spirit and scope of the present invention as defined by the appended claims.

Having thus set forth and disclosed the nature of our invention, what is claimed is:

1. In a vending machine comprising a casing; a gum container extending vertically within the casing; a shaft mounted on the casing below the container; disc elements journaled on the shaft and including radially extending slots for receiving the edges of a coin, gum engaging projections adapted to eject gum from said gum container upon a part revolution of said disc elements, and stop pins extending axially of said shaft; abutment means pivoted on said shaft for engagement with a coin retained within said slots to rotate said disc elements a part revolution; and a stop means for limiting the rotation of said disc elements to a part revolution at a time including a hook member having a hook-shaped portion for sequentially receiving one of said stop pins, a catch member for sequentially engaging and releasably retaining said one of said stop pins in the hook portion, said hook member and said catch member being pivoted at their pin engaging ends to cause them to be biased by gravity to the pin engaging position, said catch member having a releasing arm engageable by said abutment means for releasing said one of said stop pins upon the operation of said abutment means to advance the coin and disc elements, and means for limiting the pivotal movement due to gravity of said hook member and said catch member to locate said members in pin receiving and retaining position.

2. In a vending machine according to claim 1, said hook-shaped portion having a top formed for engagement with another of said pins for pivotal movement against gravity until said pin has been rotated out of engagement therewith and into engagement with said catch member.

3. In a vending machine comprising a casing; a gum container extending vertically within the casing; a shaft mounted on the casing below the container; disc elements journaled on the shaft and including radially extending slots for receiving the edges of a coin, gum engaging projections adapted to eject gum from said gum container upon a part revolution of said disc elements, and stop pins extending axially of said shaft; abutment means pivoted on said shaft for engagement with a coin retained within said slots to rotate said disc elements a part revolution; and a stop means for limiting the rotation of said disc elements to a part revolution at a ime including a hook member having a hook-shaped portion, means for pivotally mounting said hook member normally to bias the hook-shaped portion inwardly toward said shaft for sequentially receiving one of said stop pins therein, said hook-shaped portion having a camming surface sequentially engageable by another of said pins upon rotation of said disc elements for pivoting said hook member outwardly to allow said another of said pins to move into said hook-shaped portion, a catch member having a pin-engaging portion and a releasing arm, means for pivotally mounting said catch member normally to bias the pin-engaging portion inwardly into pin-engaging position for retaining said one of said pins within said hook-shaped portion, said releasing arm being engaged by said abutment means during initial pivoting movement of the abutment means and prior to engagement thereof with said coin for pivotally moving said pin-engaging portion outwardly to release said one of said pins.

4. In a vending machine according to claim 3, said catch member having an extension engageable by said abutment means during the final pivoting movement of the abutment means for moving said pin-engaging portion inwardly into position for engaging said another of said pins.

5. In a vending machine comprising a casing; a gum container extending vertically within the casing; a shaft mounted on the casing below the container; disc elements journaled on the shaft and including radially extending slots for receiving the edges of a coin, gum engaging projections adapted to eject gum from said gum container upon a part revolution of said disc elements, and stop pins extending axially of said shaft; abutment means pivoted on said shaft for engagement with a coin retained within said slots to rotate said disc elements a part revolution; and a stop means for limiting the rotation of said disc elements to a part revolution at a time including a rod mounted on said casing parallel with and below said shaft, a hook member pivotally mounted on the rod and having a hook-shaped portion extending upwardly thereof into sequential engagement with one of said pins for preventing rotation of said disc elements in one direction, a catch member pivotally mounted on the rod and having a pin-engaging portion extending upwardly thereof into sequential engagement with said one of the pins for preventing rotation of said disc elements in the other direction, said catch member having a releasing arm engageable by said abutment means during initial pivoting movement of the abutment means and prior to engagement thereof with said coin for pivoting said pin-engaging portion outwardly from said shaft to release said one of the pins, said hook member having a camming surface sequentially engageable by another of said pins upon rotation of said disc elements for pivoting said hook member outwardly to allow said another of said pins to move into said hook-shaped portion.

6. In a vending machine according to claim 5, said catch member having an extension engageable by said abutment means during the final pivoting movement of the abutment means for moving said pin-engaging portion inwardly into position for engaging said another of said pins.

GEORGE P. BOOTH.
LAWRENCE M. SMITH.

REFERENCES CITED

The following references are of record in the file of this patent:

UNITED STATES PATENTS

| Number | Name | Date |
| --- | --- | --- |
| 540,195 | Schultze | May 28, 1895 |
| 614,618 | Mills | Nov. 22, 1898 |
| 759,458 | Miles | May 10, 1904 |
| 881,037 | Vandiver | Mar. 3, 1908 |
| 1,284,319 | Grover | Nov. 12, 1918 |
| 1,370,232 | Spaulding | Mar. 1, 1921 |
| 1,371,482 | Hauserman et al. | Mar. 15, 1921 |
| 1,388,627 | Zent | Aug. 23, 1921 |
| 1,449,858 | Herot | Mar. 27, 1923 |
| 1,625,145 | O'Connor | Apr. 19, 1927 |
| 1,662,472 | Pulver | Mar. 13, 1928 |
| 1,832,081 | Ashe | Nov. 17, 1931 |
| 1,849,509 | Swan | Mar. 15, 1932 |
| 2,078,984 | Williamson | May 4, 1937 |
| 2,251,994 | Gallagher | Aug. 12, 1941 |
| 2,356,179 | Proudman et al. | Aug. 22, 1944 |